(No Model.) 13 Sheets—Sheet 1.

A. H. BOWMAN & W. P. WIDDIFIELD.
ELECTRIC BRAKE FOR RAILWAY TRAINS.

No. 398,577. Patented Feb. 26, 1889.

Witnesses:
D. W. Gardner.
George W. Murray.

Inventors:
Watson P. Widdifield
Alexander H. Bowman
By their Attorney,
Edward P. Thompson (No Model.) 13 Sheets—Sheet 3.

A. H. BOWMAN & W. P. WIDDIFIELD.
ELECTRIC BRAKE FOR RAILWAY TRAINS.

No. 398,577. Patented Feb. 26, 1889.

Witnesses:
Inventors:
Watson P. Widdifield
Alexander H. Bowman
By their Attorney,
Edward P. Thompson.

(No Model.) 13 Sheets—Sheet 4.

A. H. BOWMAN & W. P. WIDDIFIELD.
ELECTRIC BRAKE FOR RAILWAY TRAINS.

No. 398,577. Patented Feb. 26, 1889.

Witnesses:
D. W. Gardner
G. J. Miatt

Inventors:
Watson P. Widdifield
Alexander H. Bowman
By their Attorney,

(No Model.) 13 Sheets—Sheet 6.
A. H. BOWMAN & W. P. WIDDIFIELD.
ELECTRIC BRAKE FOR RAILWAY TRAINS.
No. 398,577. Patented Feb. 26, 1889.

(No Model.) 13 Sheets—Sheet 7.

A. H. BOWMAN & W. P. WIDDIFIELD.
ELECTRIC BRAKE FOR RAILWAY TRAINS.

No. 398,577. Patented Feb. 26, 1889.

N. PETERS, Photo-Lithographer, Washington, D. C.

(No Model.) 13 Sheets—Sheet 8.

A. H. BOWMAN & W. P. WIDDIFIELD.
ELECTRIC BRAKE FOR RAILWAY TRAINS.

No. 398,577. Patented Feb. 26, 1889.

Witnesses:

Inventors:

(No Model.) 13 Sheets—Sheet 9.

A. H. BOWMAN & W. P. WIDDIFIELD.
ELECTRIC BRAKE FOR RAILWAY TRAINS.

No. 398,577. Patented Feb. 26, 1889.

Witnesses:
D. W. Gardner
G. J. Miatt

Inventors:
Watson P. Widdifield
Alexander H. Bowman,
By their Attorney,
Edward P. Thompson (No Model.) 13 Sheets—Sheet 12.

A. H. BOWMAN & W. P. WIDDIFIELD.
ELECTRIC BRAKE FOR RAILWAY TRAINS.

No. 398,577. Patented Feb. 26, 1889.

(No Model.) 13 Sheets—Sheet 13.

A. H. BOWMAN & W. P. WIDDIFIELD.
ELECTRIC BRAKE FOR RAILWAY TRAINS.

No. 398,577. Patented Feb. 26, 1889.

UNITED STATES PATENT OFFICE.

ALEXANDER H. BOWMAN, OF PACKERTON, PENNSYLVANIA, AND WATSON P. WIDDIFIELD, OF UXBRIDGE, ONTARIO, CANADA, ASSIGNORS TO SAID WIDDIFIELD, ANSON TODD BUTTON, OF UXBRIDGE, AND SAMUEL STREET FULLER, OF STRATFORD, CANADA.

ELECTRIC BRAKE FOR RAILWAY-TRAINS.

SPECIFICATION forming part of Letters Patent No. 398,577, dated February 26, 1889.

Application filed October 29, 1888. Serial No. 289,469. (No model.)

*To all whom it may concern:*

Be it known that we, ALEXANDER H. BOWMAN, a citizen of the United States, and a resident of Packerton, in the county of Carbon and State of Pennsylvania, and WATSON P. WIDDIFIELD, a subject of the Queen of Great Britain, and a resident of Uxbridge, in the county of Ontario, Dominion of Canada, have invented certain new and useful Improvements in Electric Brakes for Railway-Trains, of which the following is a specification.

Our invention relates to an electric-brake system in which the rotary momentum of the car-axle is automatically communicated to the brake-lever through the medium of simple mechanism and an electric circuit.

We have filed two applications relating to the same subject-matter of invention, both showing, but only one claiming, the same thing. This, the present application, is one, while we refer to the other by the following data: Serial No. 263,373, filed February 8, 1888, and issued on December 18, 1888, jointly to our assignees and to ourselves.

The object of the invention is to provide means whereby the efficiency of an electric current may be increased. Instead of applying the electricity to lift the large friction-pulley against the car-axle, it is caused to place a smaller friction-pulley against the axle, while the force communicated to the latter pulley is transmitted by suitable mechanism to the large pulley. This said force throws the large pulley against the car-axle, and, being rotated, causes the brakes to press against the car-wheels.

A prominent feature of the invention consists of the simplicity of the mechanism employed to carry out the invention.

Referring to the drawings, Fig. 2 is a three-sided view of the larger portion of a car-truck and brake therefor. The side not shown in Fig. 2 is seen in Fig. 1. The scale of Fig. 2 is less than that of Fig. 1. In this figure are gathered every detail of the invention, while the other figures are for the purpose of making the details clearer by means of different views of the same thing or by means of enlarged views of parts not clearly represented in Fig. 2. For example, the coupling is on such a small scale in Fig. 2 that Figs. 3 and 4 are added to show the exact construction of such a coupling, Fig. 3 setting forth perspective view and Fig. 4 a side view. In Fig. 3 one-half of the coupling is shown, and in Fig. 4 both parts are shown. Fig. 6 is a plan view of the portion shown in Fig. 1. Fig. 7 is a view of the views shown in Figs. 1 and 6, taken at right angles thereto. The proportions and shapes may be a little different in this figure, but not enough to change the nature of the invention. The lever *w* is a little more horizontal in this figure than in any of the others. It is preferable to have it at such an angle and in such a position that the chain *v* is sufficiently long to be wound up and bring the larger pulley into contact with the collar on the car-axle. Part of this collar is broken away. Fig. 11 is a view, from underneath, of the containing-box of the magnets. The black spot in this figure is the hole through which passes the rod $j$. This box, with its three arms, is preferably in practice cast in one piece.

The system consists of the combination of a car-axle support, $a$, supporting the two car-wheels $b$; an enlarged portion, $c$, or collar upon the axle; two friction-pulleys, $d$ and $e$, the former being a little more than twice as large as the latter, (the proportion need not be accurate;) an axle or shaft, $f$, for the pulley $d$, and another shaft, $g$, for the pulley $e$; a bent lever, $h$, supporting the smaller pulley and pivoted to a suitable support, $i$, by means of a pivot, $i'$, connected to the lever $h$ by means of a non-magnetic rod, $j$, the armature being represented as a core, $k$, of a solenoid, F, or similar magnet; a rack, $l$, of non-magnetic metal secured to the upper part of the core and gearing into a pawl or ratchet, $m$, whose opposite end is over the core of another solenoid, $p$, or similar magnet, and which is pivoted to the solenoid F. When the core of solenoid $p$ is attracted upward, the core $k$ is liberated and falls downward by the action of the spring-arm of the lever $h$ and by gravitation. The device consists, further, of a second bent lever, $r$, supporting the axle $f$ and pivoted upon a journal, $o$, upon the support $q$; a chain, $v$, connected at one end to the second bent lever through the medium of a third lever, $w$, and at the other end to the axle of the smaller pulley, and a chain-connection, $s$, between the shaft of the larger pulley and the brake-lever $t$. The lever $w$ is pivoted on support $q$ between the chain end and that end which connects the lever $r$. The chain $v$ is preferably in a vertical line. The shaft $f$ fits rather loosely in the bearing $u$, so that the pulley $e$ may move and strike against the collar $c$ when the lever $r$ is operated by the chain $v$. The shaft $g$, also, for similar reasons, is loose in its bearing $x$.

The lever $h$ is a spring-lever, being formed of elastic plate metal—such as the best steel, for example. The arm of the lever to which the pulley $e$ is supported is in a plane at right angles to that arm of same lever attached to the core $j$. The latter arm is flat in a horizontal plane, so that it forms an elastic connection between the said core and the pulley $e$. The lever $w$ is of such length that when the brake is on full the chain end of the lever $w$ strikes the bearing $x$ or support at that end of the shaft $g$ opposite the pulley $e$, while the supports or arms $q$ and $i$ are represented as projecting from a containing-box, I, for the said solenoids. The pivot on the arm or support $q$ for the lever $w$ is slightly nearer the box than the upper end of the lever $r$, so that the chain end of the lever $w$ may be substantially in a vertical line passing through the axis of the shaft $g$.

The cores of the solenoids F and $p$ are only about half the length of the solenoids, while the non-magnetic rods $n$ and $l$ are of much smaller diameter than the cores, while the holes in the iron spools of the solenoids are shown at the upper portions smaller than at the lower portions. The rod $n$ passes through the upper portion of the solenoid $p$, and the rack $l$ passes through the upper portion of the solenoid F. The core of the solenoid $p$ (lettered $n'$) fits in the lower portion of the solenoid. At the lower ends of the cores are iron disks attached thereto and forming integral portions of the cores.

By the above construction of core and solenoid a long pull may be obtained, so that the stronger the current in the solenoid F, for instance, the greater will be the pressure of the pulley $e$ upon the collar $c$. This collar $c$ is made of alternate rings of metal and fibrous substance—such as wood—mounted upon the shaft or axle $a$, and formed thereon by surrounding the shaft with a suitable mold and casting metal and inserting the said fibrous substance alternately. It is evident that the magnets and cores may be multiplied in order to increase or distribute the power or for any other reason.

Figure 15:
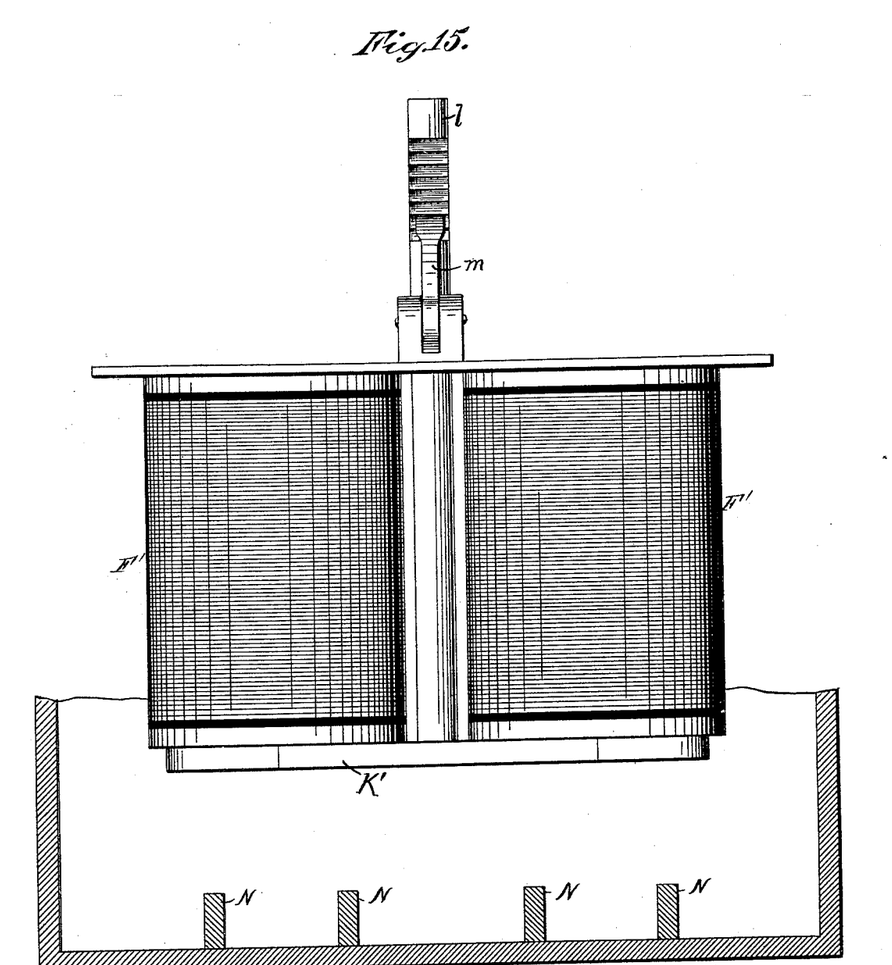
Fig. 15 is a view of another way of constructing the solenoids and ratchet-work, shown partially in section and in outside view.
Figure 16:
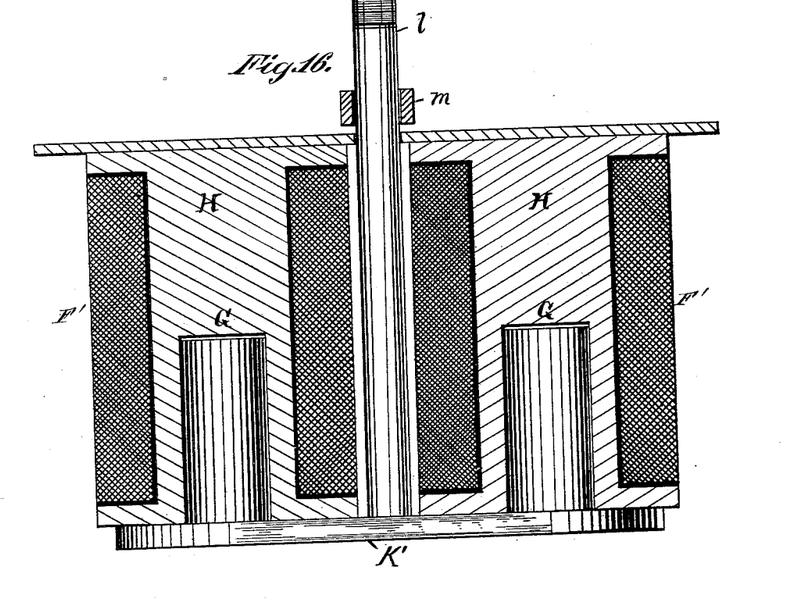
Fig. 16 is a sectional view of the device represented in Fig. 15. Portion of the device is in full outside view.
Figure 17:
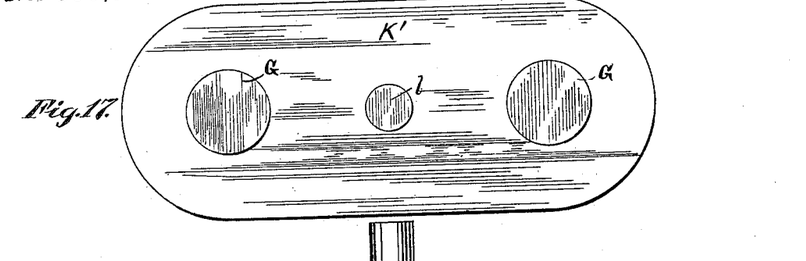
Fig. 17 is a plan view of the rack and core shown in Fig. 16.

In Figs. 15, 16, and 17 the rack $l$ is attached to a connecting iron piece, K', to which are attached two movable cores, G, half the length of the solenoids F and F', in which they fit loosely. The upper halves of the fixed cores H of the said solenoids are of solid iron, while the lower halves contain holes in which fit loosely the said cores G.

The electrical portion of the system consists (see particularly Fig. 12) of the combination of two generators, the one A being located in or on the locomotive of the train of cars to which our invention is applicable, and the other, A', being located upon the last car of the train, one or more couplings (one being shown in external elevation) serving to connect the conductors which pass from the additional generators, M and M', similarly located, a conductor, B, connecting similar poles of the generators A and A', two other conductors, C and D, D being open in the last car at circuit-closer X, connecting the remaining similar poles of the same generators, the magnet or solenoid F being in the circuit of the conductors B and C, and solenoid P being in the circuit of the conductors B and D, a circuit-closer, E, normally open and in conductor D, a circuit-closer, P, normally open and in conductor C, both of said circuit-closers in practice being located upon the locomotive, and a circuit-closer, P', normally open and in conductor C, and located in the last car of the train, the circuit-closers P and P' being of magnetic material, such as soft iron. Electro-magnets Q and Q' are respectively beneath circuit-closers P and P', and, being normally in closed circuit with batteries M and M' by conductor T, (one of the generators M and M' may be omitted, if desired, or one or more cells of the battery A or A' may be employed,) they (the magnets) maintain the said circuit-closers in an open condition against the tension of the springs R and R', (represented by the zigzag line in Fig. 12 at the letters R and R'.) When the wires or conductors break at one or more points between the locomotive and last car, the circuit-closers P and P' will close an active circuit through what may be termed the "brake-magnet" F, and thereby bring all the cars to a gradual but quick stop, as will appear hereinafter from the statement of operation of the system.

Figure 1:
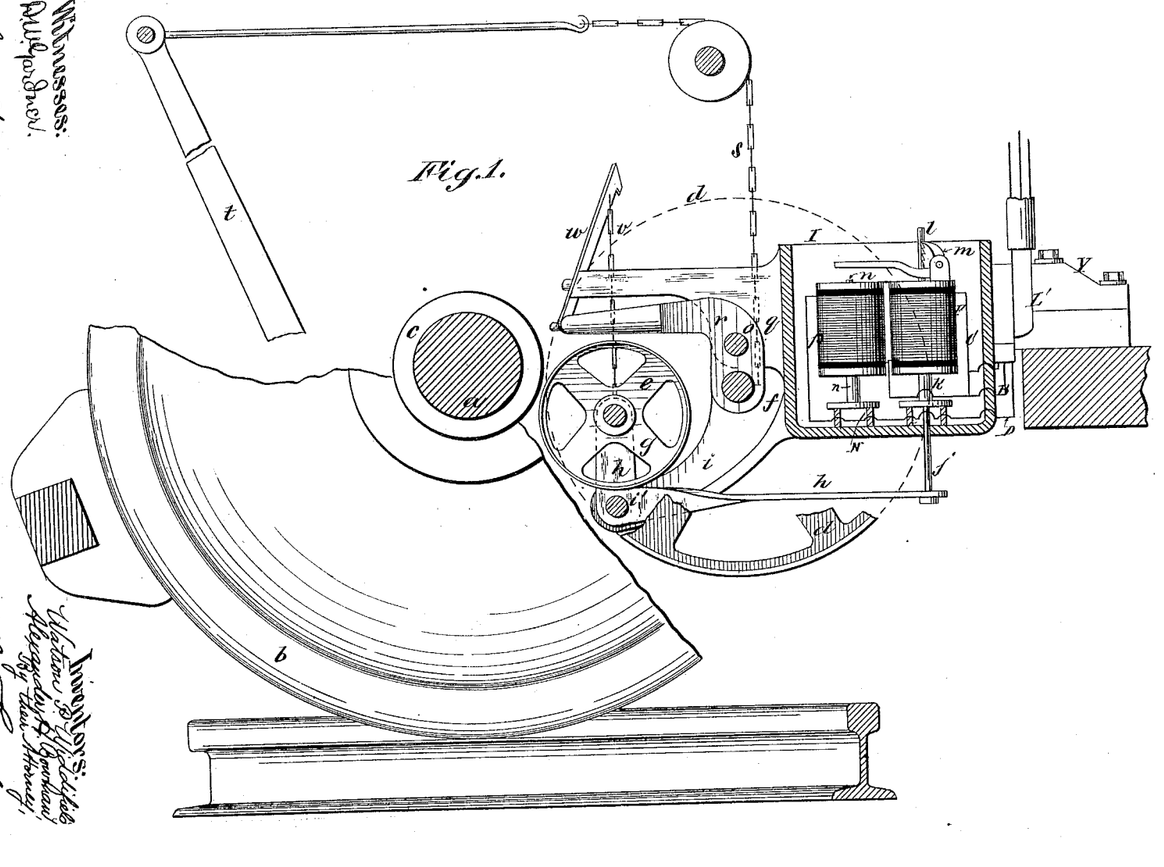
Figure 1 is an orthographic side elevation, partially in section, of a portion of a car-truck and brake therefor.

Upon the box I, (see Fig. 1,) in any convenient position, is located a coupling, L', similar to that indicated by L, except that the springs S, which are the terminals of the conductor T, are omitted, because the conductor T does not pass through the coupling L'.

Figure 3:
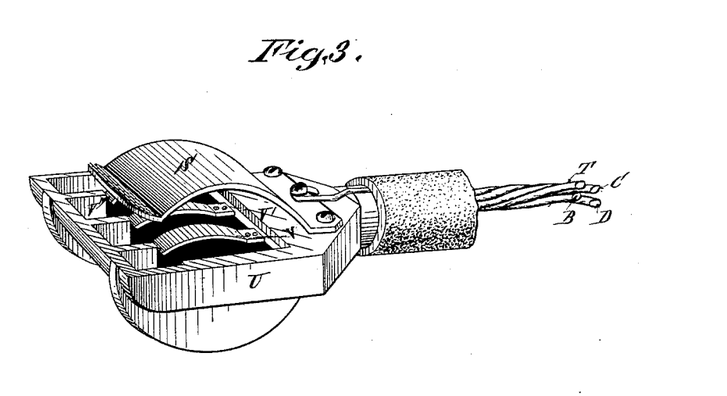
Figure 4:
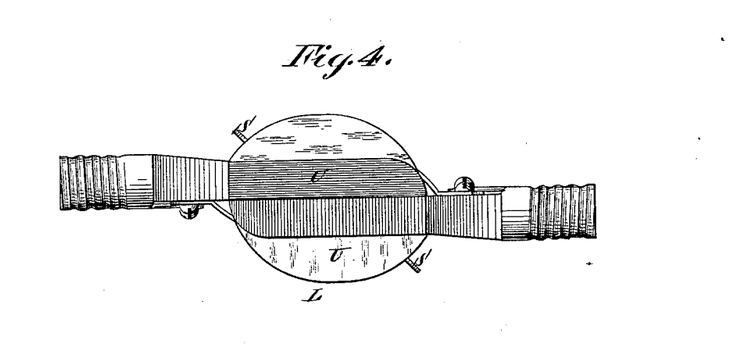
Figure 5:
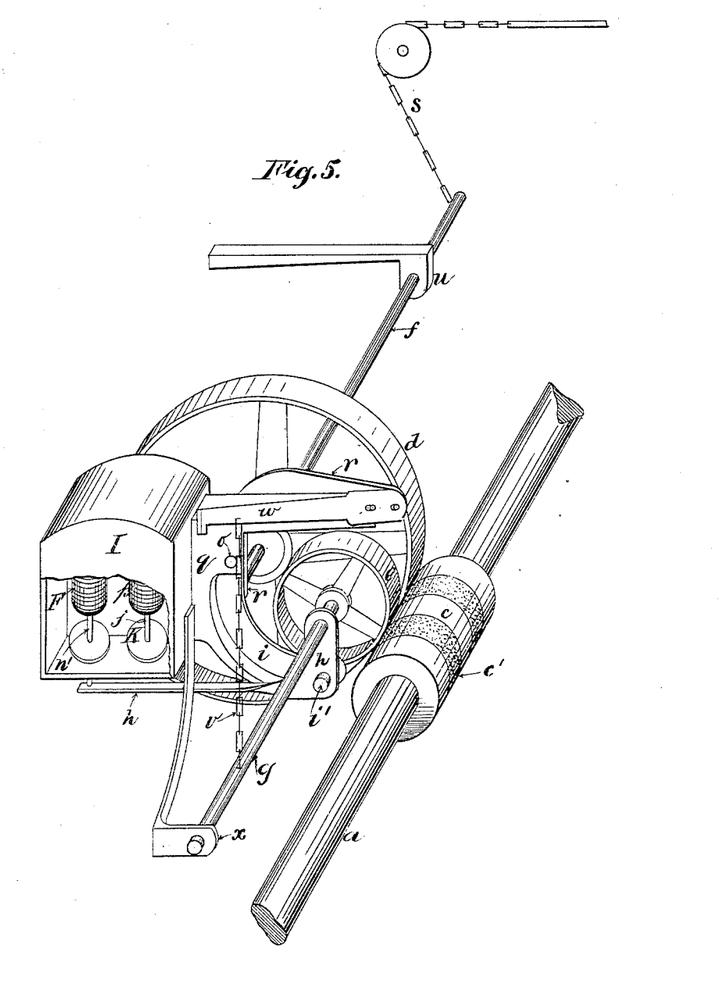
Fig. 5 is an enlarged view of Fig. 2 as to the mechanism of the brake, the spring-lever in this figure being on opposite sides of the arm *i* from what is shown in Fig. 2. This enables the whole spring-lever to be seen in the full operating mechanism. This spring-lever is seen in opposite view from that appearing in Fig. 1.
Figure 6:
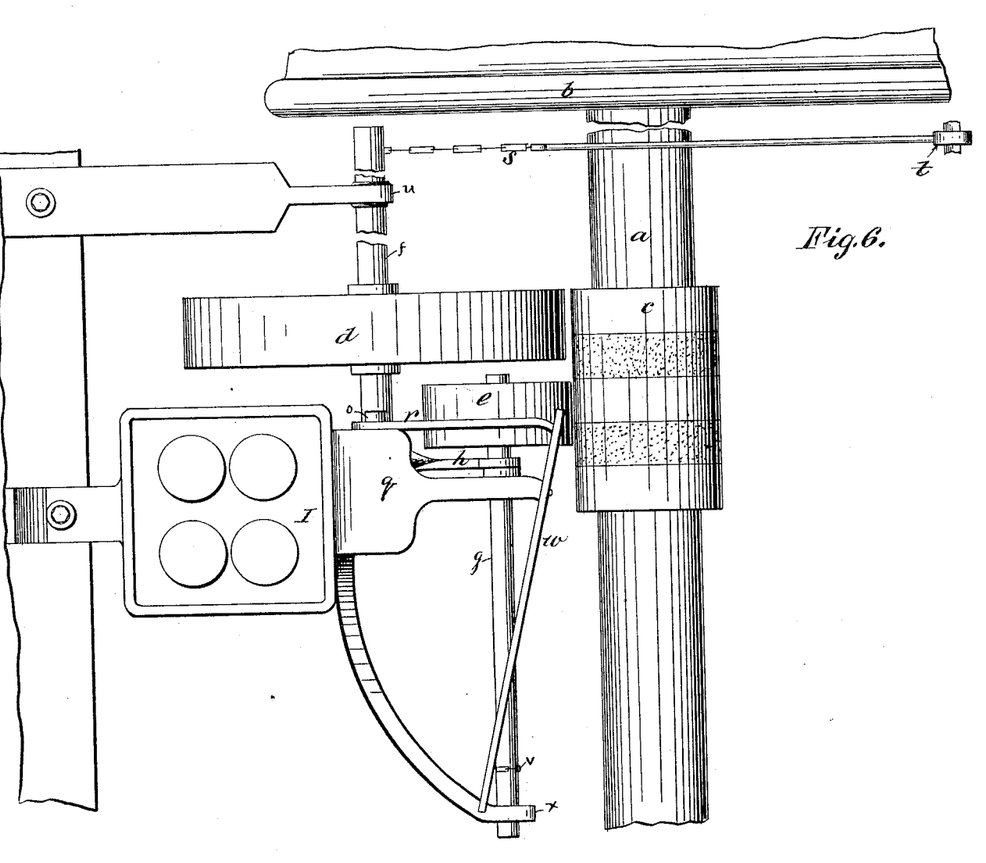
Fig. 6 is a plan view of the pulleys and levers of the brake system, and shows also the four magnets, or rather two double magnets, which serve to operate the brake when included in an electric circuit. Two of them serve to apply the brake and the remaining two serve to release the brake. A small portion of the truck is also shown in Fig. 6. With a slight deviation in proportion and shape of the different parts.
Figure 7:
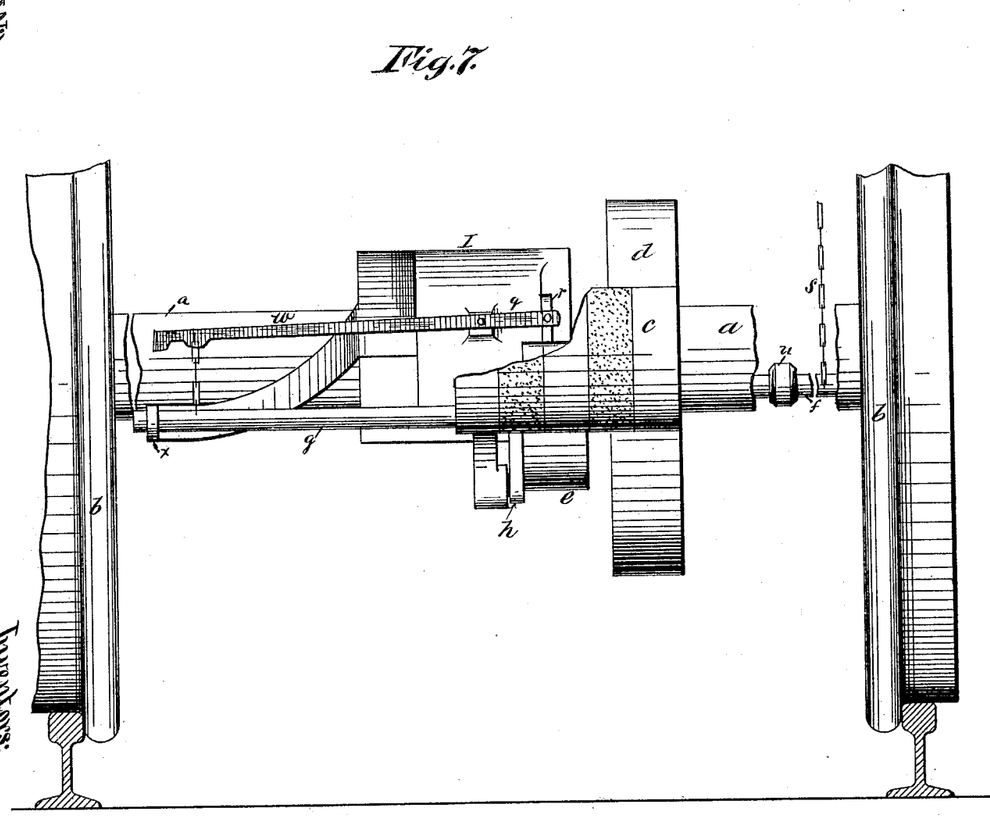
Figure 8:
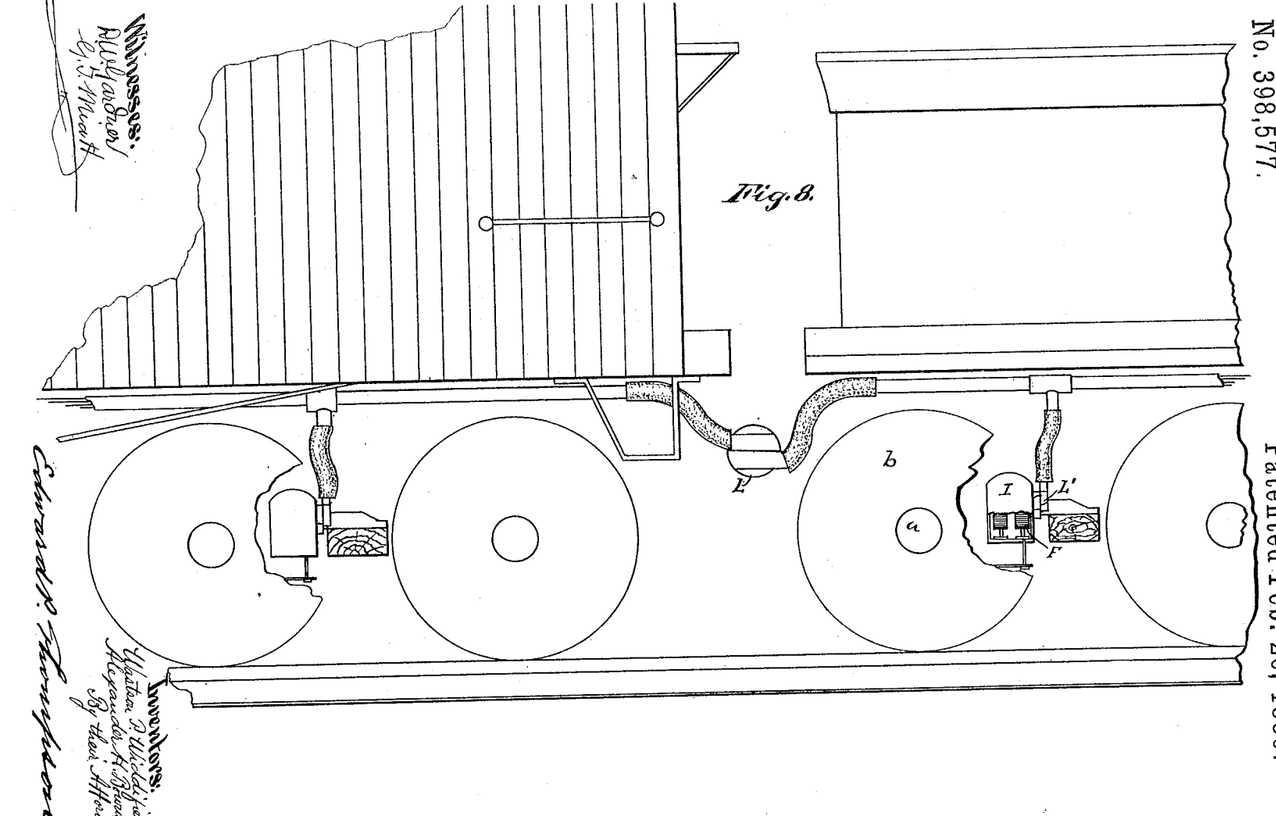
Fig. 8 is a side elevation of a portion of a locomotive-tender and freight-car in which may be seen the conduits for the wires and their branches and the couplings ready for use. The four wires of the system may be seen projecting from the conduits or pipes. The branch pipes are preferably made of rubber to allow of greater ease in separating the wires in uncoupling the cars or in uncoupling the magnets of the brakes on the various cars.
Figures 9, 10:
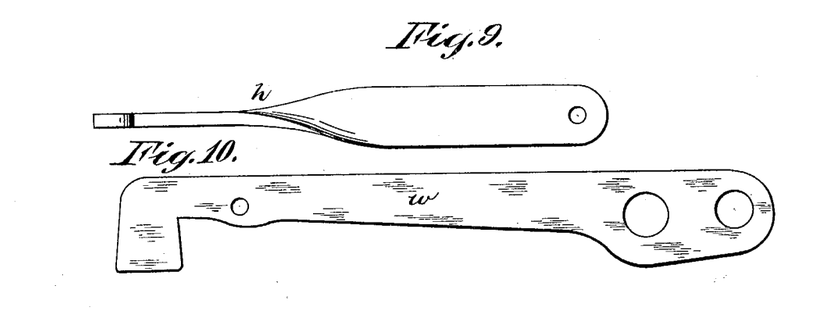
Fig. 9 is a plan view of the lever $h$, on an enlarged scale and by itself.
Fig. 10 is a side view of the lever $w$, on an enlarged scale and by itself.
Figure 11:
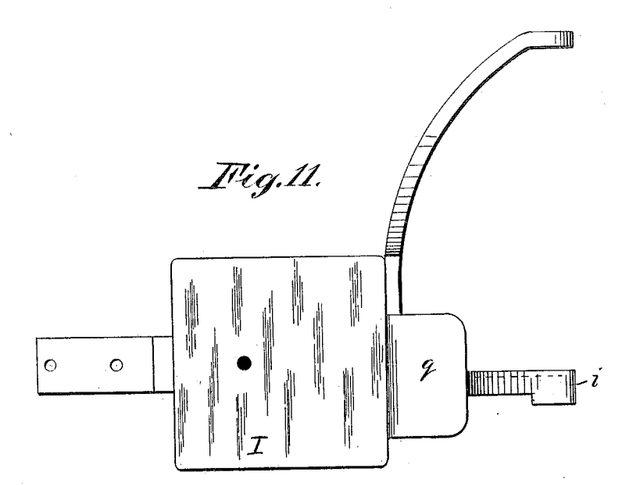

The coupling seen in half, on an enlarged scale, in Fig. 3 consists of the combination of a metal frame, U, hollow and containing three terminals, V V' V'', respectively belonging to the conductors B, C, and D, and mounted upon insulation, W, in the interior of the frame or casing U, and provided with the terminal S, secured to the outside of the casing. Each terminal is elastic, and is adapted to press upon its mate in the other half, so that the outward appearance becomes substantially as shown at L in Fig. 8. This portion of the system may be manipulated by pushing and pulling the two halves with one's hands in order, respectively, to couple and uncouple the circuits. The conductor T in the system becomes continuous by its attachment to the terminal S.

Figure 12:
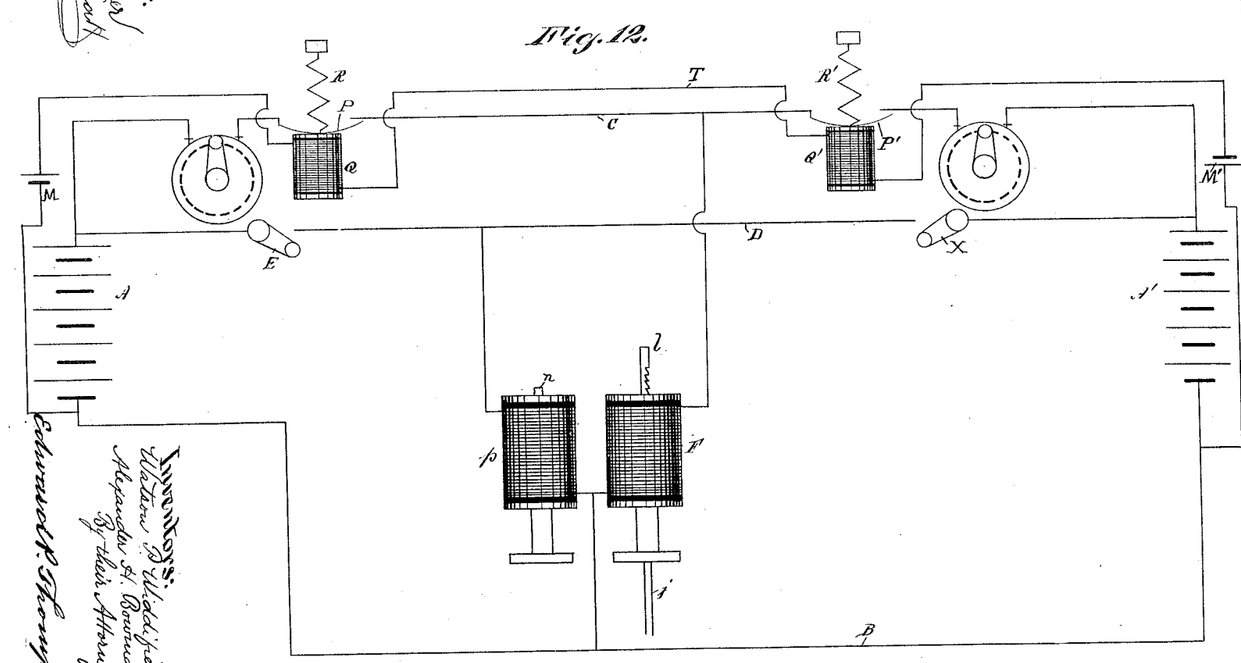
Fig. 12 represents the principle underlying the electrical distribution of the system.
Figure 13:
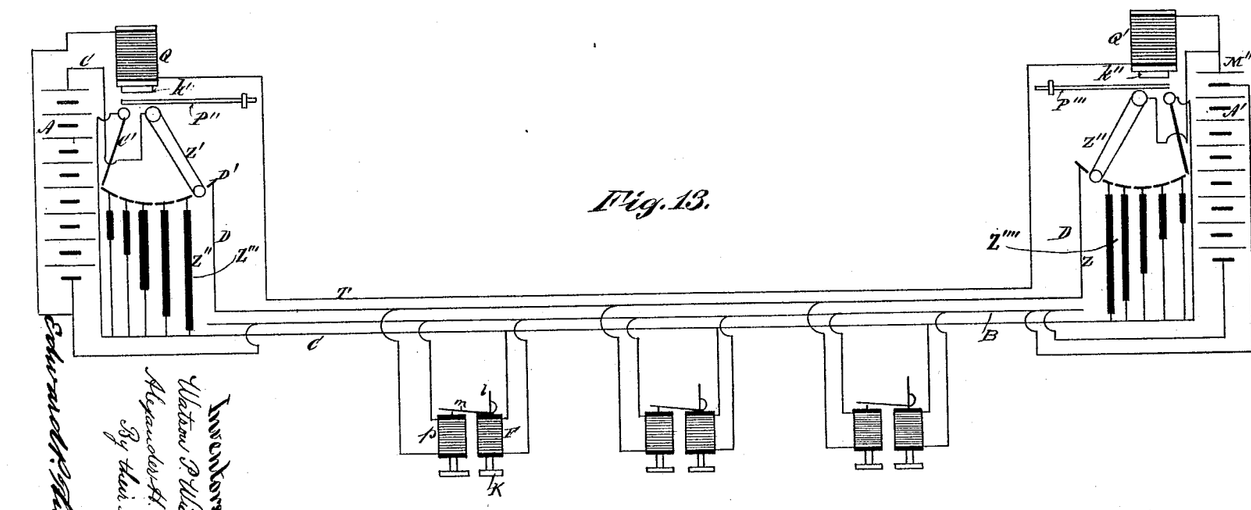
Fig. 13 is a representation of a more complete and practical arrangement of the parts composing the electrical features of the system. In this figure is seen one switch taking the place of three switches; also, the cells M and M' are replaced by one of the cells of one of the batteries A and A'.
Figure 14:
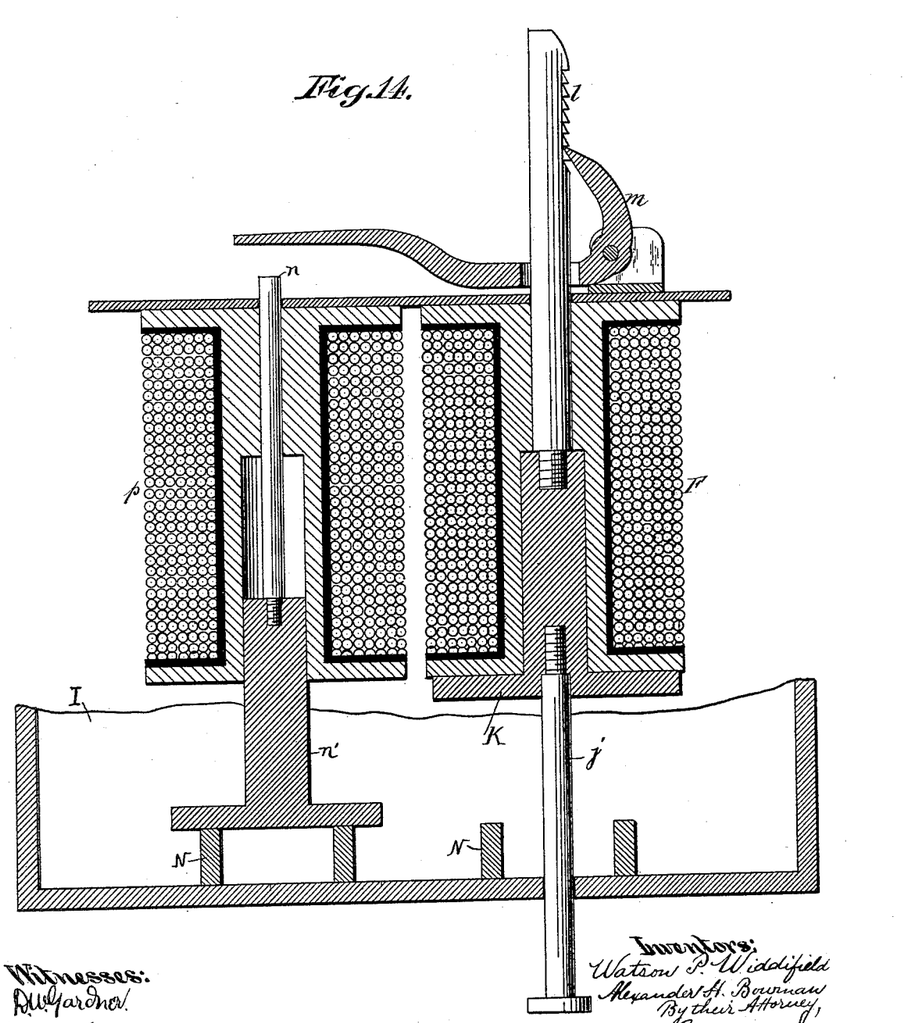
Fig. 14 is a sectional view of one disposition of solenoids, cores, and ratchet-work employed in our invention, it being the same as shown in part in Figs. 1, 2, 5, and 8.

The distribution shown in Fig. 13 consists of the combination of the same elements as shown in regard to Fig. 12, except that one of the cells, M'', of the battery A' is substituted for the batteries or cells M and M', except that the springs R and R' and circuit-closers P and P' are replaced by the levers P'' and P''', which are so supported as to remain normally between the terminals of the conductor C and the magnets Q and Q', except that a movable armature, $k''$, is provided for each of the said magnets, the said armature being adapted to press the lever P'', for instance, upon the terminals of conductor C when the said armature is released, and except that switches Z' and Z'' are provided for closing the circuit through the conductor D to release the brake for including the graduated resistances Z''' and Z'''' in circuit with the conductor C, and for connecting the terminals of the conductor C without any resistance. As either switch Z' or Z'' is turned to the left from the position shown as regards Z' or to the right as regards the switch Z'', the brake will be gradually applied, and finally the whole force of the battery will be exerted upon the brake. If the wire T breaks, as may happen from the breaking apart of the train of cars, the armature $k'$ and $k''$ will fall and connect the terminals of the conductor in both the locomotive and caboose, and therefore the brakes will be instantly applied.

The details of the automatic switch for closing the terminals of the conductor C when the train breaks may be varied without departing from the spirit of our invention.

Figure 2:
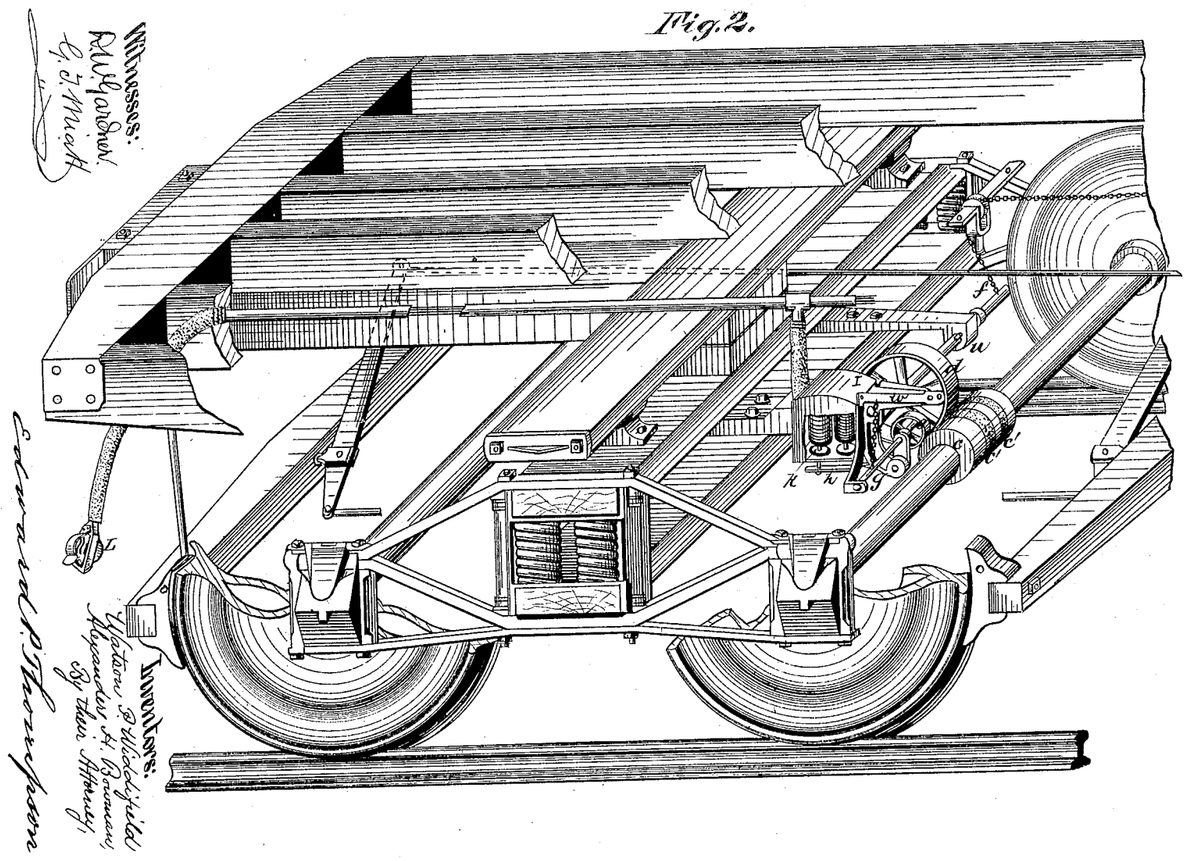

The *modus operandi*, succinctly described, is as follows: Assuming that the brake is in its normal condition, as exhibited in the illustrations, and that the train is in motion, and that it is desired to stop or slacken the motion of said train, the engineer by means of a convenient handle closes the circuit-closer P, so that from the nature of the construction hereinbefore mentioned the solenoid F becomes energized and attracts its core upward. If convenient, rheostats Z and Z' (one in the locomotive and one in the caboose or last car) are introduced in this circuit conveniently near the circuit-closer P, or if other means are provided for varying the current, it is evident that the current may be gradually applied. The spring-lever $h$ becomes operated through the medium of the rod $j$ in such a manner that the small friction-pulley $e$ is pressed against the collar $c$ with a force or pressure dependent upon the amount of electric current applied to the solenoid F. The elastic or spring arm of the lever $h$ serves to regulate the application of the force of the electric current in the solenoid. If this arm were not slender enough to be springy, or if an equivalent elastic connection were not provided, the brake would not be smoothly applied. When the said pulley $e$ touches the rotating collar $c$, it turns and its shaft $g$ winds up the chain $r$, which is attached to the said shaft and also to the lever $w$. If the full and sufficient current is applied, it is interesting to note that the chain end of the said lever $w$ will descend until it comes in contact with the arm which assists in supporting the shaft $g$, and which is shown in Fig. 2. The consequent operation of the lever $w$, turning about the fulcrum on the arm $g$, rotates the lever $r$ until the large pulley $d$ is pressed against the collar $c$. A rotation of this pulley now occurs, and its shaft winds chain $s$, thereby operating the brake-lever $t$, which is connected by any suitable mechanism to the pressure-blocks of the brake.

The functions of the ratchet $m$ and the rack $l$ are to retain the pulley $e$ against the collar $c$. This pulley $e$ may be removed from the collar $c$ and brought again into its normal position by closing the switch E, thereby energizing the solenoid $p$, whose core rises and liberates the ratchet $m$, so that the core $k$ falls. A suitable stop, N, may be provided for the core $k$ and that of solenoid $p$, so that they will not fall too far out of the solenoids. In Fig. 2 the bottom of the box I is shown as such a convenient means, the solenoids F and $p$ being placed in this figure nearer the bottom of said box. If the coupling L accidentally or otherwise breaks apart, or if the electric conductors break, the train will automatically stop, because the current will be cut off from the magnets Q and Q', whereby the circuit-closers P and P' will be closed, and whereby, therefore, a similar operation will occur as mentioned above. As the magnets Q and Q' are preferably on the last vehicle of the train, all the brakes on the cars will be applied by the breaking of the train into two sections. If for any reason any one of the brake mechanisms is to be cut out of circuit, the coupling L' may be separated by hand. It is evident that the solenoids for applying and releasing the brakes may be termed "electric motors."

The apparatus in the locomotive is preferably duplicated in the rear car, so that the whole system may be operated from either end of the train.

The generator A serves for all ordinary purposes, while the generator A' serves in case of accident or occasional use; hence the generator A', the generator M', and conductor T may be termed "auxiliary appliances."

The terms "solenoid" and "magnets" or "electro-magnets" are used interchangeably in such places where it is evident that the one or the other can be employed to carry out our invention. For instance, it makes no difference whether the devices Q and Q' are solenoids or electro-magnets. In the description the device R'' is called an "armature;" but it is evident that it may have a projection located in the center of the device Q or Q'. In this case the armature would be a core of a solenoid. It is well known in the art and in the definitions in books on the subject that a solenoid is always a magnet, and may be used as such by closing a circuit through the same.

The operation of the distribution shown in Fig. 13 is as follows: To gradually stop the train, assuming that the same is in motion, turn the handle Z', for instance, to the left, thereby introducing less and less length of resistances Z''', and finally turn it so far as to connect the other terminal of the conductor of the system, (lettered C.) This other terminal in the figure is lettered C'. To release the brake, turn the same handle to the right, so that it will come into contact with the terminal marked D' of the conductor D, thereby causing the current to pass through the releasing-solenoid $p$. Similar results may be obtained with the handle or switch Z''. The operation of the system or construction shown in Figs. 15, 16, and 17 is similar to that shown in the other figures containing the brake and releasing-solenoids. There is this difference, however, and that is that the double form shown in Figs. 15, 16, and 17 is found in practice to be more economical. The large mass of iron above the cores $k$ and the core of the solenoid $p$ furnishes better results than when a hole is made in this mass for the passage of the rod $l$ and the rod connected with the core of the solenoid $p$. Further, two cores have to lift only one rod or rack $l$ and rod $j$. The solenoid $p$ doubled is not shown, as the construction is so similar to that of the double form of the solenoid F.

The term "fiber" as applied to the collar-rings $c'$ may consist of wood or cotton.

We claim as our invention—

1. In a system of electric brakes for railway-trains, the combination of an electro-magnet, a second electro-magnet, two independent electric circuits, respectively including said electro-magnets, a third electric circuit, T, including an electric-magnetic closing-switch normally closed as to the magnet of the circuit-closer, the circuit-closer itself being adapted to close the first electro-magnet's circuit, a suitable circuit-closer for the second electro-magnet's circuit, electric generators of equal electro-motive force, the one located on the locomotive of the train and the other on the last car of the train and connected in opposition with the said two independent electric circuits, and a third electric generator in circuit with the magnet of the said electro-magnetic circuit-closer.

2. In a system of electric brakes for railway-trains, the combination of two friction-pulleys, the one connected to the brake-lever and the other to the armature of an electro-magnet, and both being connected to each other and geared to a collar upon the car-axle, the said collar consisting of alternate rings of metal and fiber secured upon the car-axle.

3. In a system of electric brakes for railway-trains, the combination, with the friction-pulleys of the brake, of a collar upon which the said pulleys press, the said collar consisting of alternate rings of fibrous substance, as wood and metal.

4. In a system of electric brakes for railway-trains, the combination of a car-axle provided with a collar, a friction-pulley supported upon a lever, a friction-pulley of smaller diameter than the first-named pulley and whose shaft is connected to said lever, both pulleys being adjustable relatively to the said collar, a lever applied at one end to the smaller pulley and at the other end or arm to the core of a solenoid, the said arm being elastic, as and for the purpose described, a retaining device for the said core, consisting of a rack and pawl, and a second solenoid whose armature or core is in the path of the said pawl and so arranged as to be adapted to release the pawl from said rack, the said solenoids being located in suitable electric circuits.

5. In an electric-brake system for railway-trains, the combination of a normally-closed electric circuit, brakes on all the cars of the train normally out of action, a normally-open circuit, means for closing the latter to bring the brakes into action, electro-magnets in the said first circuit, and magnetic circuit-closers within attractive distance of said electro-magnets and included in circuit with the said normally-open circuit, electric generators located on both the locomotive of the train and on the rear car and included in circuit with said electric circuits.

6. In a system of electric brakes, the combination of a friction-pulley adapted to be brought in engagement with the axle of the car-wheels, a lever for applying the pulley to the axle, an elastic arm for the said lever, a solenoid, and a rod connecting the said elastic arm to the core of said solenoid.

7. In a system of electric brakes for railway-trains, the combination of a pulley in frictional contact with one of the axles of the wheels of the train, a shaft carrying said pulley and supported at one end to a suitable bearing and at the other end by one arm of a pivoted bent lever, a second pivoted lever hinged at one end to the remaining arm of the first lever and at the other end to a chain, a second pulley in frictional contact with the said axle and whose shaft is supported by a suitable bearing at one end and upon one arm of a third bent pivoted lever at another point, the said shaft being connected to said chain, a second chain connecting the shaft of the first pulley to the brake-lever, a solenoid whose core is connected elastically to the arm of the lever which supports the second pulley, a ratchet or toothed projection for the said core and a pawl engaging said ratchet, and a second solenoid whose core is adapted to trip said pawl, the said solenoids being included in independent electric circuits.

8. In an electric-brake system, the combination of two electric generators, the one A being located on the locomotive of the train of cars, and the other, A', being located upon the last car of said train, one or more electric couplings connecting the conductors which pass from the generators, of which there is one more generator, M, similarly located, a conductor, B, connecting similar poles of the first-named generators, two other conductors connecting the remaining similar or like poles of the same generators, a magnet, F, in circuit with the last-named conductors B and C, and a second magnet, $p$, being in circuit with the conductors B and D, a circuit-closer, E, normally open and in conductor D, a circuit-closer, P, normally open and in conductor C, both of said circuit-closers being located upon the locomotive and on the rear car, a circuit-closer, P', normally open and in conductor C, and located on the last car of the train, the circuit-closers P and P' being of magnetic material—such as soft iron—and magnets Q and Q', located within attracting distance beneath the said circuit-closers P and P', and normally in closed circuit with battery M by a conductor, T, and thereby maintaining said circuit-closers open against tension-springs R and R', respectively connected to said circuit-closers.

9. In a system of electric brakes for railway-trains, the combination of two generators of equal electro-motive force connected in opposition in such a manner that one conductor, B, connects two similar poles of the two generators, and two other conductors, C and D, connect the remaining two similar poles of the same generators, a solenoid in circuit with a conductor connecting the conductors B and C, a second solenoid in circuit with a conductor connecting the conductors B and D, the conductors D and C being normally open, a normally-closed circuit containing a magnet whose core is connected with a normally-open circuit-closer in conductor C, and a suitable generator for said normally-closed circuit.

10. In a system of electric brakes for railway-trains, the combination of two solenoids, movable cores for both solenoids, stops located under the cores at such a distance below the solenoids that the cores cannot fall away from the attractive influence of the solenoids, a rack or toothed rod secured to one of the said cores and gearing into a ratchet which is pivoted and whose one arm is located in the path of the core of the other solenoid, and a spool for the windings of the solenoids, the said spools having openings for the cores.

In testimony that we claim the foregoing as our invention we have signed our names, in presence of two witnesses, this 25th day of October, 1888.

ALEXANDER H. BOWMAN.
WATSON P. WIDDIFIELD.

Witnesses for Bowman:
  RALPH W. POPE,
  EDWARD P. THOMPSON.
Witnesses for Widdifield:
  JOHN W. WIDDIFIELD,
  M. FRANKISH.